(12) United States Patent
Mun

(10) Patent No.: US 8,731,612 B2
(45) Date of Patent: May 20, 2014

(54) MOBILE TERMINAL AND CONTROLLING METHOD THEREOF

(75) Inventor: Su Jung Mun, Seoul (KR)

(73) Assignee: LG Electronics Inc., Seoul (KR)

( * ) Notice: Subject to any disclaimer, the term of this patent is extended or adjusted under 35 U.S.C. 154(b) by 689 days.

(21) Appl. No.: 12/533,127

(22) Filed: Jul. 31, 2009

(65) Prior Publication Data

US 2010/0304788 A1    Dec. 2, 2010

(30) Foreign Application Priority Data

May 28, 2009 (KR) .......................... 10-2009-0046903

(51) Int. Cl.
*H04M 1/00* (2006.01)

(52) U.S. Cl.
USPC ...... 455/556.1; 455/416; 455/417; 348/14.01

(58) Field of Classification Search
CPC ..... H04W 4/00; H04W 4/02; H04N 5/23229; H04N 7/14; H04N 7/141; H04N 7/15
USPC .......... 455/556.1, 415–417; 348/14.01, 14.02
See application file for complete search history.

(56) References Cited

U.S. PATENT DOCUMENTS

| | | | | |
|---|---|---|---|---|
| 6,192,257 B1* | 2/2001 | Ray | ............................... | 455/566 |
| 6,788,332 B1* | 9/2004 | Cook | .......................... | 348/14.02 |
| 2004/0201667 A1* | 10/2004 | Hasegawa | ................... | 348/14.02 |
| 2005/0088513 A1* | 4/2005 | Oswald et al. | ............. | 348/14.02 |
| 2005/0140778 A1* | 6/2005 | Kim et al. | .................... | 348/14.02 |
| 2005/0141529 A1* | 6/2005 | Miyajima et al. | ............. | 370/401 |
| 2005/0277421 A1* | 12/2005 | Ng | ................. | 455/445 |
| 2007/0039025 A1* | 2/2007 | Kraft et al. | ....................... | 725/62 |
| 2007/0057866 A1* | 3/2007 | Lee et al. | ....................... | 345/1.1 |
| 2007/0070184 A1* | 3/2007 | Kim et al. | ................... | 348/14.02 |
| 2007/0094620 A1* | 4/2007 | Park | ............................... | 715/862 |
| 2007/0195158 A1* | 8/2007 | Kies | ........................... | 348/14.01 |
| 2008/0004073 A1* | 1/2008 | John et al. | ................... | 455/556.1 |
| 2008/0072263 A1* | 3/2008 | Kim | ............................ | 725/62 |
| 2008/0084482 A1* | 4/2008 | Hansson et al. | ........... | 348/218.1 |
| 2008/0094467 A1* | 4/2008 | An et al. | ..................... | 348/14.02 |
| 2008/0117283 A1* | 5/2008 | Yang et al. | ................. | 348/14.02 |
| 2008/0222688 A1* | 9/2008 | Han | ............................. | 725/106 |
| 2008/0231726 A1* | 9/2008 | John | ........................... | 348/223.1 |
| 2009/0017870 A1* | 1/2009 | An | ................................. | 455/565 |
| 2009/0186596 A1* | 7/2009 | Kaltsukis | .................... | 455/404.2 |
| 2009/0249225 A1* | 10/2009 | Beswick et al. | .............. | 715/756 |
| 2009/0325554 A1* | 12/2009 | Reber | ......................... | 455/414.1 |

\* cited by examiner

*Primary Examiner* — Kashif Siddiqui
*Assistant Examiner* — Mong-Thuy Tran
(74) *Attorney, Agent, or Firm* — KED & Associates LLP

(57) ABSTRACT

A mobile terminal may be provided that includes a camera module, a wireless communication unit to perform a video call with another party, a display to display a video call relevant image, a location information module to obtain location information of the mobile terminal, and a controller to obtain object information of an object within an image captured by the camera module based on the obtained location information of the mobile terminal. The controller may control the obtained object information to be transmitted to a terminal of the other party.

28 Claims, 12 Drawing Sheets

FIG. 6
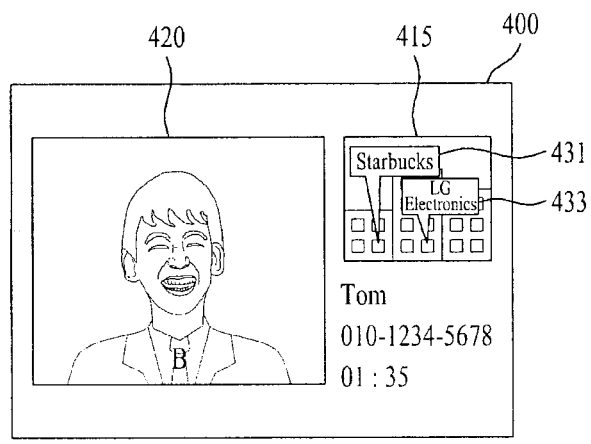
(6-1)
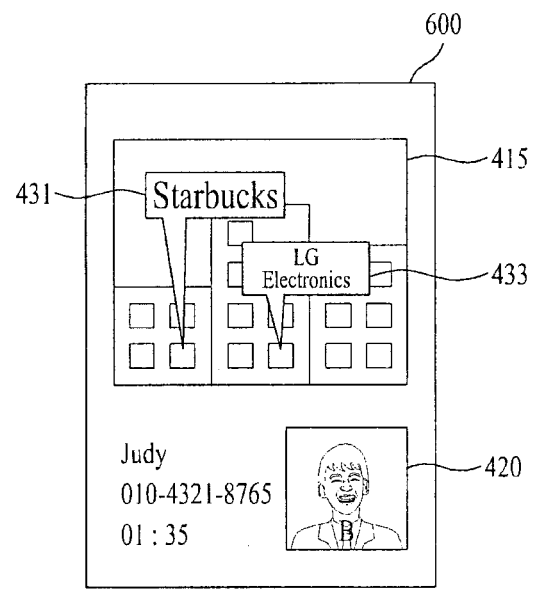
(6-2)

FIG. 7
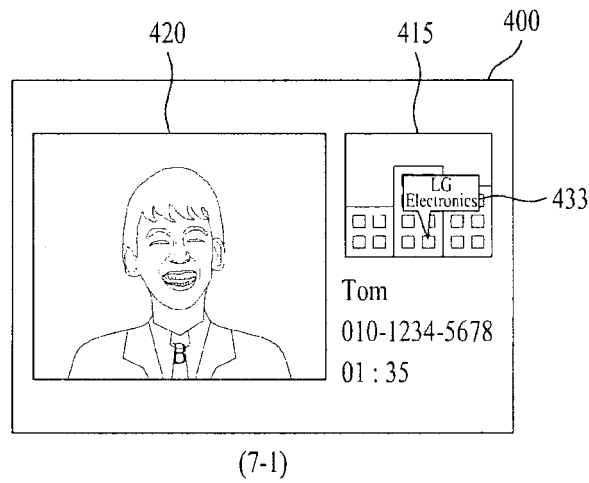
(7-1)
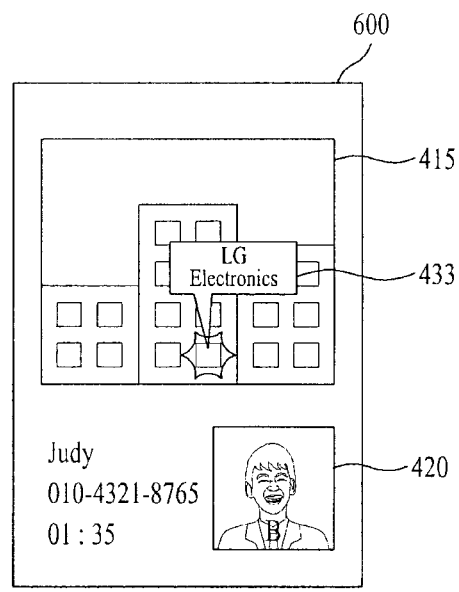
(7-2)

FIG. 8
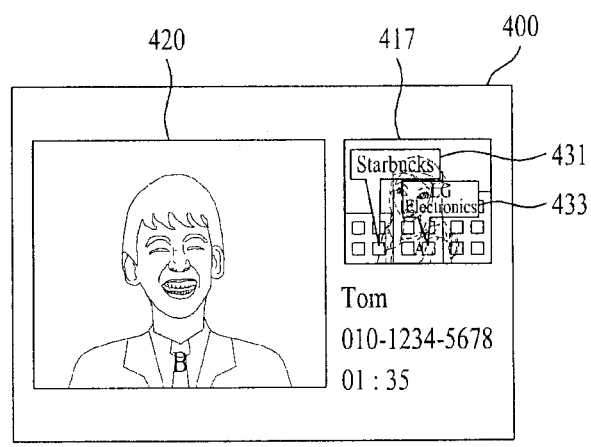
(8-1)
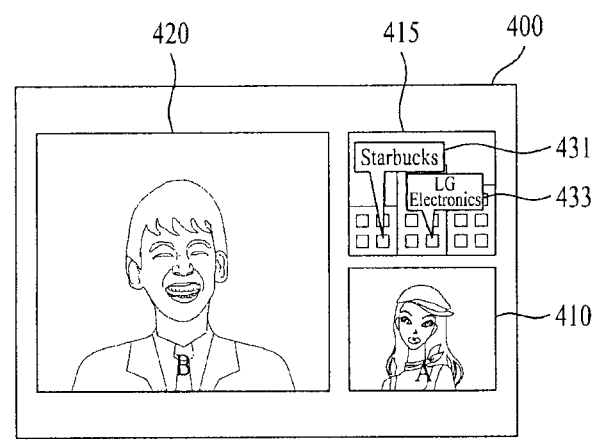
(8-2)

FIG. 9
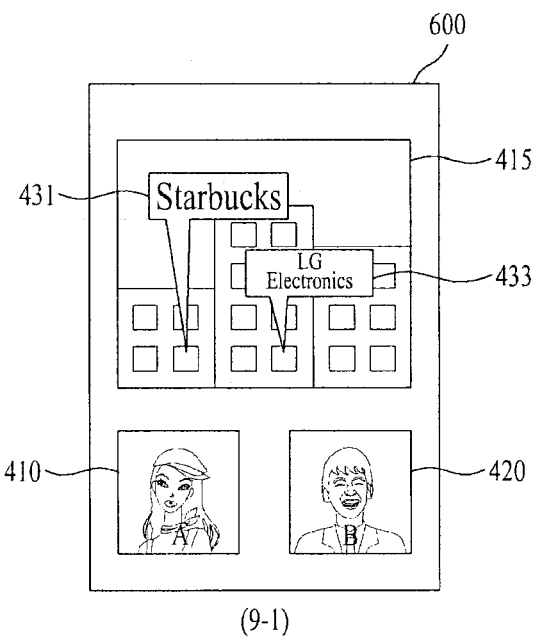
(9-1)
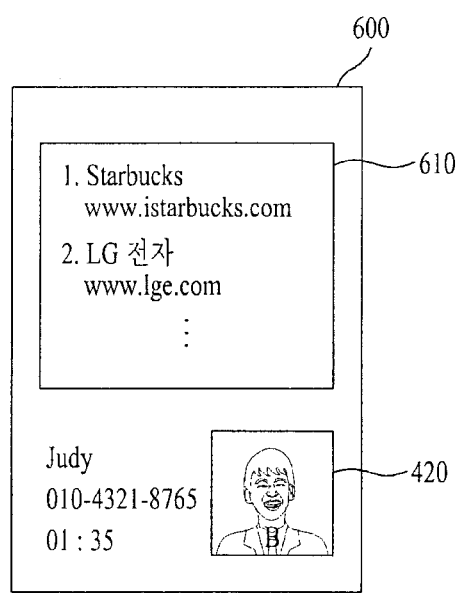
(9-2)

FIG. 10
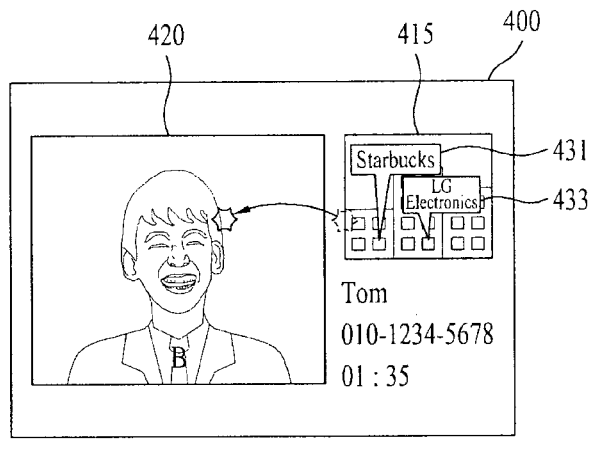
(10-1)
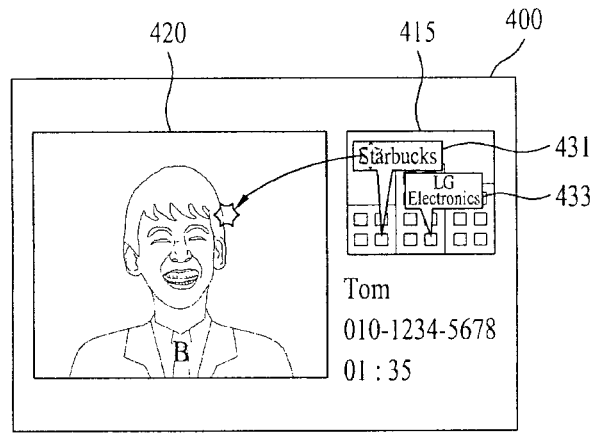
(10-2)
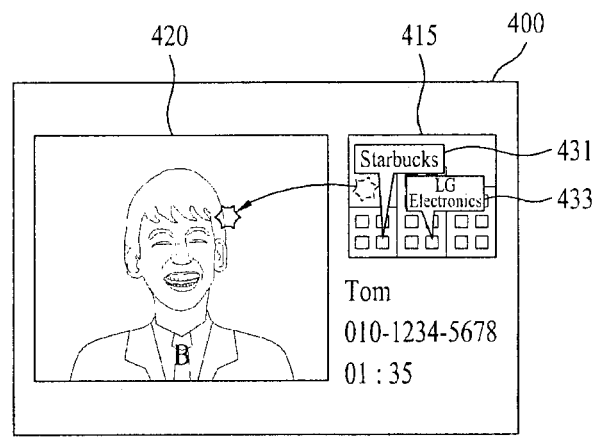
(10-2)

FIG. 12
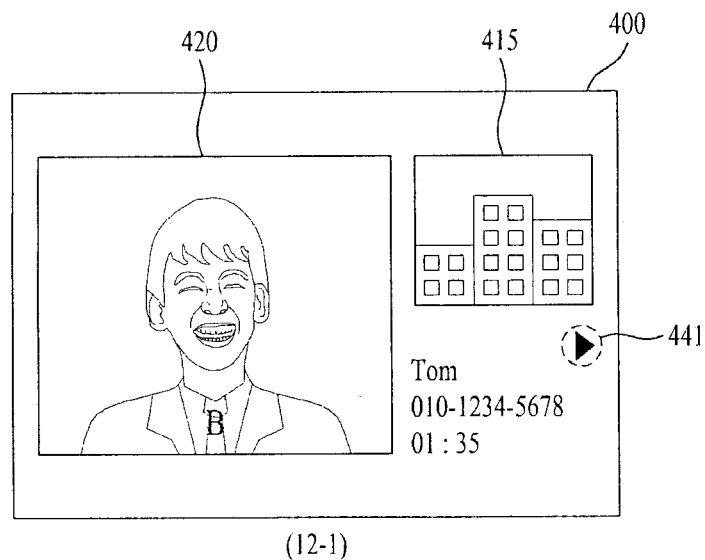
(12-1)
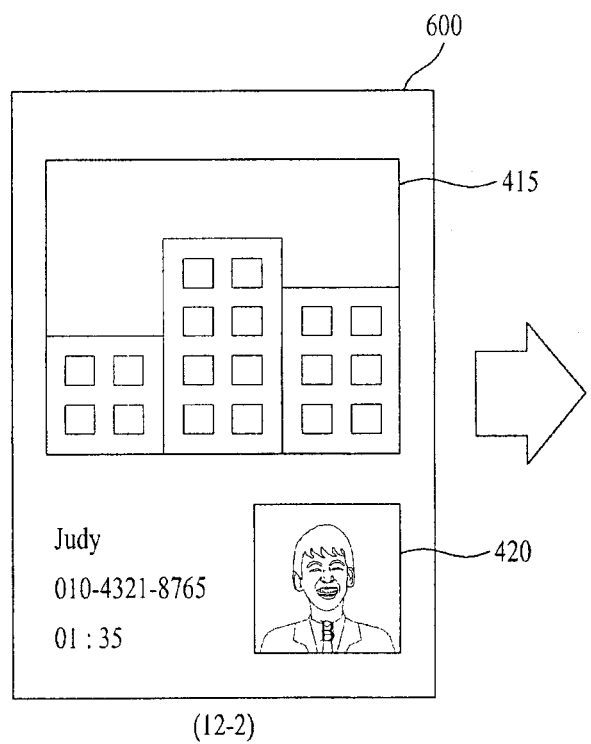
(12-2)

MOBILE TERMINAL AND CONTROLLING METHOD THEREOF

This application claims priority from Korean Application No. 10-2009-0046903, filed May 28, 2009, the subject matter of which is hereby incorporated by reference.

BACKGROUND

1. Field

Embodiments of the present invention may relate to a mobile terminal and a controlling method thereof.

2. Background

A mobile terminal may perform various functions. Examples of such functions include data and voice communications, capturing images and video via a camera, recording audio, playing music files and outputting music via a speaker system, and displaying images and video on a display. Some terminals may include additional functionality that supports game playing, while other terminals may also be configured as multimedia players. Mobile terminals have been configured to receive broadcast and multicast signals that permit viewing of contents, such as videos and television programs.

Terminals may be classified as mobile terminals and stationary terminals according to a presence or non-presence of mobility. The mobile terminals may be further classified as handheld terminals and vehicle mount terminals based on availability for hand-carry.

There are efforts to support and increase functionality of mobile terminals. The efforts include software and hardware improvements as well as changes and improvements in structural components that form the mobile terminal.

A mobile terminal capable of a video call may enable a user to communicate with another user by viewing each other. When the video call is performed between two terminals, more information may need to be transceived together with speech and video of the users to increase efficiency of utility.

BRIEF DESCRIPTION OF THE DRAWINGS

Arrangements and embodiments may be described in detail with reference to the following drawings in which like reference numerals refer to like elements and wherein:

FIGS. 6 to 12 are diagrams for screen configurations of a display according to example embodiments.

DETAILED DESCRIPTION

Reference may now be made in detail to the embodiments of the present invention, examples of which may be illustrated in the accompanying drawings. It is to be understood by those of ordinary skill in this technological field that other embodiments may be utilized, and structural, electrical, as well as procedural changes may be made without departing from the intended scope. A same reference number may be used throughout the drawings to refer to the same or like parts.

The suffixes 'module', 'unit' and 'part' may be used for elements in order to facilitate this disclosure. Significant meanings or roles may not be given to the suffixes themselves and it is understood that 'module', 'unit' and 'part' may be used together or may be used interchangeably.

Embodiments may be applicable to a various types of terminals. Examples of such terminals may include mobile as well as stationary terminals, such as mobile phones, user equipment, smart phones, DTV, computers, digital broadcast terminals, personal digital assistants, portable multimedia players (PMP) and navigators.

While the following description may be provided with regard to a mobile terminal 100, it should be understood that such teachings may apply to other types of terminals.

Figure 1:
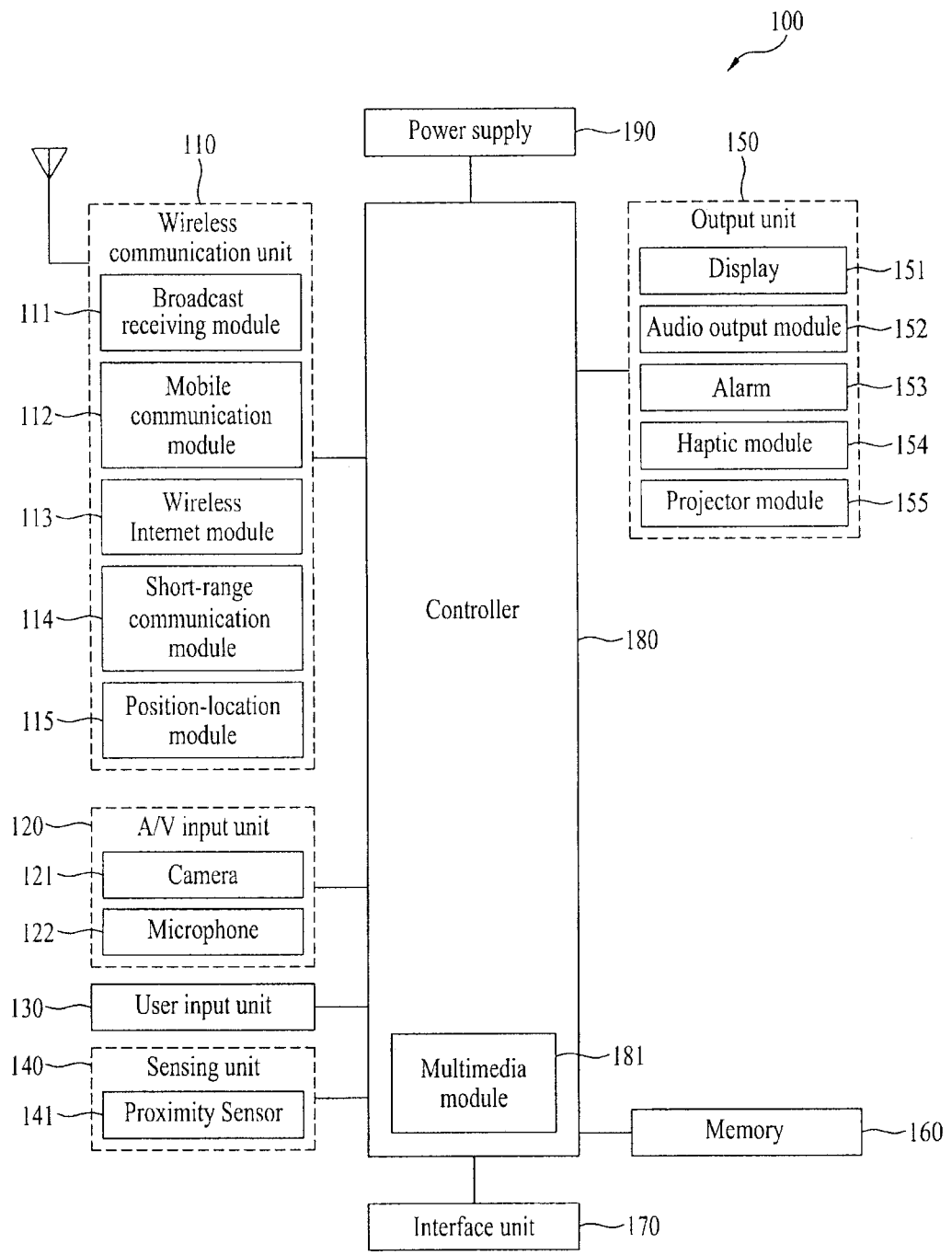
FIG. 1 is a block diagram of a mobile terminal according to one example embodiment.

FIG. 1 is a block diagram of a mobile terminal in accordance with an example embodiment. Other embodiments, configurations and arrangements may also be provided. FIG. 1 shows a mobile terminal 100 that includes a wireless communication unit 110, an A/V (audio/video) input unit 120, a user input unit 130, a sensing unit 140, an output unit 150, a memory 160, an interface unit 170, a controller 180, a power supply 190 and the like. FIG. 1 shows the mobile terminal 100 having various components, although all the illustrated components are not required. More or less numbers of components may alternatively be implemented.

The wireless communication unit 110 may include one or more components that permit wireless communication between the mobile terminal 100 and a wireless communication system or network within which the mobile terminal 100 is located. For example, the wireless communication unit 110 may include a broadcast receiving module 111, a mobile communication module 112, a wireless Internet module 113, a short-range communication module 114, a position-location module 115 (or location module) and the like.

The broadcast receiving module 111 may receive a broadcast signal and/or broadcast associated information from an external broadcast managing server via a broadcast channel.

The broadcast channel may include a satellite channel and a terrestrial channel.

The broadcast managing server may be a server that generates and transmits a broadcast signal and/or broadcast associated information or a server that is provided with a previously generated broadcast signal and/or broadcast associated information and then transmits the provided signal or information to a terminal. The broadcast signal may be implemented as a TV broadcast signal, a radio broadcast signal, and a data broadcast signal, for example. The broadcast signal may further include a broadcast signal combined with a TV or radio broadcast signal.

At least two broadcast receiving modules 111 may be provided on the mobile terminal 100 to pursue simultaneous reception of at least two broadcast channels or broadcast channel switching facilitation.

The broadcast associated information may include information associated with a broadcast channel, a broadcast program, a broadcast service provider, etc. The broadcast associated information may be provided via a mobile communication network. The broadcast associated information may be received by the mobile communication module 112.

The broadcast associated information may be implemented in various forms. For example, broadcast associated information may include an electronic program guide (EPG) of digital multimedia broadcasting (DMB) and an electronic service guide (ESG) of digital video broadcast-handheld (DVB-H).

The broadcast receiving module 111 may receive broadcast signals transmitted from various types of broadcast systems. For example, the broadcasting systems may include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). The broadcast receiving module 111 may be suitable for other broadcasting systems as well as the above-explained digital broadcasting systems.

The broadcast signal and/or broadcast associated information received by the broadcast receiving module 111 may be stored in a suitable device, such as the memory 160.

The mobile communication module 112 may transmit/receive wireless signals to/from one or more network entities (e.g., a base station, an external terminal, a server, etc.). The wireless signals may represent audio, video, and/or data according to text/multimedia message transceivings, for example.

The wireless Internet module 113 may support Internet access for the mobile terminal 100. The wireless Internet module 113 may be internally or externally coupled to the mobile terminal 100. The wireless Internet technology may include WLAN (Wireless LAN) (Wi-Fi), Wibro (Wireless broadband), Wimax (World Interoperability for Microwave Access), HSDPA (High Speed Downlink Packet Access), etc.

The short-range communication module 114 may facilitate relatively short-range communications. Technologies for implementing this module may include radio frequency identification (RFID), infrared data association (IrDA), ultra-wideband (UWB), as well as networking technologies commonly referred to as Bluetooth and ZigBee, for example.

The position-location module 115 may identify or otherwise obtain the location or position of the mobile terminal 100. The position-location module 115 may be implemented with a global positioning system (GPS) module.

The GPS module 115 may precisely calculate current 3-dimensional position information based on at least one of longitude, latitude, altitude, and direction (or orientation) by calculating distance information and precise time information from at least three satellites and then applying triangulation to the calculated information. Location and time information may be calculated using three satellites, and errors of the calculated location position and time information may then be amended using another satellite. The GPS module 115 may calculate speed information by continuously calculating a real-time current location.

The audio/video (A/V) input unit 120 may provide audio or video signal input to the mobile terminal 100. The A/V input unit 120 may include a camera 121 and a microphone 122. The camera 121 may receive and process image frames of still pictures or video that are obtained by an image sensor in a video call mode or a photographing mode. The processed image frames may be displayed on the display 151.

The image frames processed by the camera 121 may be stored in the memory 160 or may be externally transmitted via the wireless communication unit 110. Two or more cameras 121 may be provided on the mobile terminal 100 based on an environment of usage.

The microphone 122 may receive an external audio signal while the mobile terminal 100 is in a particular mode, such as a phone call mode, a recording mode and/or a voice recognition. The audio signal may be processed and converted into electric audio data. The processed audio data may be transformed into a format transmittable to a mobile communication base station via the mobile communication module 112 in case of a call mode. The microphone 122 may include noise removing algorithms (or noise cancelling algorithms) to remove or reduce noise generated in the course of receiving the external audio signal.

The user input unit 130 may generate input data responsive to user manipulation of an associated input device or devices. Examples of such devices include a keypad, a dome switch, a touchpad (e.g., static pressure/capacitance), a jog wheel, a jog switch, etc.

The sensing unit 140 may provide sensing signals for controlling operations of the mobile terminal 100 using status measurements of various aspects of the mobile terminal 100. For example, the sensing unit 140 may detect an open/close status of the mobile terminal 100, relative positioning of components (e.g., a display and a keypad) of the mobile terminal 100, a change of position of the mobile terminal 100 or a component of the mobile terminal 100, a presence or absence of user contact with the mobile terminal 100, and/or an orientation or acceleration/deceleration of the mobile terminal 100. The mobile terminal 100 may be configured as a slide-type mobile terminal. In this configuration, the sensing unit 140 may sense whether a sliding portion of the mobile terminal 100 is open or closed. Other examples include the sensing unit 140 sensing the presence or absence of power provided by the power supply 190, the presence or absence of a coupling or other connection between the interface unit 170 and an external device. The sensing unit 140 may include a proximity sensor 141.

The output unit 150 may generate outputs relevant to senses of sight, hearing, touch and/or the like. The output unit 150 includes the display 151, an audio output module 152, an alarm 153, a haptic module 154, a projector module 155 and the like.

The display 151 may visually display (i.e., output) information associated with the mobile terminal 100. For example, if the mobile terminal 100 is operating in a phone call mode, the display 151 may provide a user interface (UI) and/or a graphical user interface (GUI) that includes information associated with placing, conducting, and/or terminating a phone call. As another example, if the mobile terminal 100 is in a video call mode or a photographing mode, the display 151 may additionally or alternatively display images that are associated with these modes, the UI or the GUI.

The display 151 may be implemented using known display technologies including, for example, a liquid crystal display (LCD), a thin film transistor-liquid crystal display (TFT-LCD), an organic light-emitting diode display (OLED), a flexible display and/or a three-dimensional display. The mobile terminal 100 may include one or more of such displays.

Some of the displays may be implemented in a transparent or optical transmittive type that can be called a transparent display. A transparent OLED (TOLED) may be a representative example for the transparent display. A rear configuration of the display 151 may also be implemented as the optical transmittive type. In this configuration, a user may see an object in rear of a terminal body via the area occupied by the display 151 of the terminal body.

Two or more displays 151 may be provided on the mobile terminal 100 based on the configuration of the mobile terminal 100. For example, a plurality of displays may be arranged on a single face of the mobile terminal 100 by being spaced apart from each other or by being built on one body. A plurality of displays may be arranged on different faces of the mobile terminal 100.

If the display 151 and a sensor for detecting a touch action (hereafter called a touch sensor) are configured as a mutual layer structure (hereafter called a touchscreen), the display 151 may be used as an input device as well as an output device. The touch sensor may be configured as a touch film, a touch sheet, a touchpad and/or the like.

The touch sensor may convert a pressure applied to a specific portion of the display 151 or a variation of a capacitance generated from a specific portion of the display 151 to an electric input signal. The touch sensor may detect a pressure of a touch as well as a touched position or size.

If a touch input is made to the touch sensor, signal(s) corresponding to the touch may be transferred to a touch controller. The touch controller may process the signal(s) and then transfer the processed signal(s) to the controller 180. The controller 180 may know whether a prescribed portion of the display 151 is touched.

The proximity sensor 141 may be provided at an internal area of the mobile terminal 100 enclosed by the touchscreen and/or around the touchscreen. The proximity sensor 141 may detect a presence or a non-presence of an object approaching a prescribed detecting surface or an object existing around the proximity sensor 141 using an electromagnetic field strength or infrared ray without mechanical contact. The proximity sensor 141 may have a longer durability than a contact type sensor and may also have a wider utility than the contact type sensor.

The proximity sensor 141 may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and/or the like. If the touchscreen includes the electrostatic capacity proximity sensor, it may detect the proximity of a pointer using variations of electric field based on proximity of the pointer. In this case, the touchscreen (touch sensor) may be classified as the proximity sensor.

In the following description, an action that a pointer approaches without contacting the touchscreen may be called a proximity touch. An action that a pointer actually touches the touchscreen may be called a contact touch. The meaning of the position on the touchscreen proximity-touched by the pointer may mean the position of the pointer that vertically opposes the touchscreen when the pointer performs the proximity touch.

The proximity sensor 141 may detect a proximity touch and a proximity touch pattern (e.g., a proximity touch distance, a proximity touch duration, a proximity touch position, a proximity touch shift state, etc.). Information corresponding to the detected proximity touch action and the detected proximity touch pattern may be outputted to the touchscreen.

The audio output module 152 may function in various modes including a call-receiving mode, a call-placing mode, a recording mode, a voice recognition mode, a broadcast reception mode and/or the like to output audio data that is received from the wireless communication unit 110 or is stored in the memory 160. During operation, the audio output module 152 may output audio relating to a particular function (e.g., a call received, a message received, etc.). The audio output module 152 may be implemented using one or more speakers, buzzers, other audio producing devices, and/or combinations thereof The alarm 153 may output a signal for announcing an occurrence of a particular event associated with the mobile terminal 100. Events may include a call received event, a message received event and a touch input received event. The alarm 153 may output a signal for announcing the event occurrence by way of vibration as well as a video or audio signal. The video or audio signal may be outputted via the display 151 and/or the audio output unit 152. The display 151 and/or the audio output module 152 may be regarded as part of the alarm 153.

The haptic module 154 may generate various tactile effects that can be sensed by a user. Vibration may be a representative one of the tactile effects generated by the haptic module 154. Strength and pattern of the vibration generated by the haptic module 154 may be controllable. For example, different vibrations may be outputted by being combined (or synthesized) together or may be outputted in sequence.

The haptic module 154 may generate various tactile effects as well as vibration. For example, the haptic module 154 may generate an effect attributed to an arrangement of pins vertically moving against a contact skin surface, an effect attributed to injection/suction power of air though an injection/suction hole, an effect attributed to a skim over a skin surface, an effect attributed to contact with an electrode, an effect attributed to an electrostatic force, an effect attributed to representation of hold/cold sense using an endothermic or exothermic device and/or the like.

The haptic module 154 may enable a user to sense a tactile effect through a muscle sense of a finger, an arm and/or the like as well as to transfer the tactile effect through a direct contact. At least two haptic modules 154 may be provided on the mobile terminal 100 based on configuration of the mobile terminal 100.

The projector module 155 may perform an image projector function using the mobile terminal 100. The projector module 155 may display an image that is identical to or partially different from at least the image displayed on the display 151. The image may be displayed on an external screen or wall according to a control signal of the controller 180.

The projector module 155 may include a light source (not shown) that generates light (e.g., a laser) for externally projecting an image, an image producing means (not shown) for producing an image to externally output using the light generated from the light source, and a lens (not shown) for enlarging to externally output the image in a predetermined focus distance. The projector module 155 may further include a device (not shown) for adjusting an image projected direction by mechanically moving the lens and/or the whole module.

The projector module 155 may be classified as a CRT (cathode ray tube) module, an LCD (liquid crystal display) module, a DLP (digital light processing) module and/or the like based on a device type of a display means. The DLP module may operate by a mechanism of enabling light generated from the light source to reflect on a digital micromirror device (DMD) chip and may be advantageous for downsizing the projector module 155.

The projector module 155 may be provided in a length direction of a lateral, front or backside direction of the mobile terminal 100. The projector module 155 may be provided at any portion of the mobile terminal 100 based on the necessity.

The memory 160 may store various types of data to support processing, control, and/or storage requirements of the mobile terminal 100. Examples of such data include program instructions for applications operating on the mobile terminal 100, contact data, phonebook data, messages, audio, still pictures, moving pictures, etc. A recent use history or a cumulative use frequency of each data (e.g., use frequency for each phonebook, each message and/or each multimedia) may be stored in the memory 160.

The memory 160 may store a database of object information (e.g., a building, a shop, a milepost, etc.) using recognition information (i.e., a pattern recognition) relevant to an object within an image captured by the camera 121 and/or location information of the mobile terminal 100 obtained by the position-location module 115. The object information may include at least one of relevant text information of the object (e.g., a name of the building, a name of the shop, etc.), relevant link information (e.g., link information of the building or the shop), relevant image information (e.g., an image logo of the building or the shop, etc.) and/or relevant audio information (e.g., a logo song of the building or the shop).

Data for various patterns of vibration and/or sound outputted in case of a touch input to the touchscreen may be stored in the memory 160.

The memory 160 may be implemented using any type or combination of suitable volatile and non-volatile memory or storage devices including a hard disk, a random access memory (RAM), a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic or optical disk, a multimedia card micro type memory, a card-type memory (e.g., SD memory, XD memory, etc.), and/or other similar memory or data storage device. The mobile terminal 100 may operate in association with a web storage for performing a storage function of the memory 160 on the Internet.

The interface unit 170 may couple the mobile terminal 100 with external devices. The interface unit 170 may receive data from the external devices or may be supplied with the power and then transfer the data or power to the respective elements of the mobile terminal 100 or enable data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module may be a chip for storing various kinds of information for authenticating a use authority of the mobile terminal 100 and may include a User Identify Module (UIM), a Subscriber Identify Module (SIM), a Universal Subscriber Identity Module (USIM) and/or the like. A device having the identity module (hereafter called an identity device) may be manufactured as a smart card. Therefore, the identity device may be connectible to the mobile terminal 100 via the corresponding port.

When the mobile terminal 110 is connected to an external cradle, the interface unit 170 may become a passage for supplying the mobile terminal 100 with a power from the cradle or a passage for delivering various command signals inputted from the cradle by a user to the mobile terminal 100. Each of the various command signals inputted from the cradle or the power may operate as a signal enabling the mobile terminal 100 to recognize that the mobile terminal 100 is correctly loaded in the cradle.

The controller 180 may control overall operations of the mobile terminal 100. For example, the controller 180 may perform control and processing associated with voice calls, data communications, video calls, etc. The controller 180 may include a multimedia module 181 that provides multimedia playback. The multimedia module 181 may be configured as part of the controller 180, or may be implemented as a separate component.

The controller 180 may perform a recognizing process (such as a pattern recognizing process) for recognizing a writing input and a picture drawing input carried out on the touchscreen as characters or images, respectively.

The controller 180 may identify a prescribed image portion of a prescribed image through the recognizing process.

The controller 180 may implement an augmented reality (AR) technology. The augmented reality is one of virtual realities that can provide one image by combining a real word image (as seen by a user) and a virtual world (having additional information). Augmented reality complements a real world with a virtual world and provides information for a real world. Augmented reality may be a combination of real world and computer generated data.

The power supply 190 may provide power required by the various components for the mobile terminal 100. The power may be internal power, external power, and/or combinations thereof.

Embodiments may be implemented in a computer-readable medium using, for example, computer software, hardware, and/or some combination thereof For a hardware implementation, embodiments may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, and/or a selective combination thereof. Embodiments may also be implemented by the controller 180.

For a software implementation, embodiments may be implemented with separate software modules, such as procedures and functions, each of which may perform one or more of the functions and operations described herein. Software codes may be implemented with a software application written in any suitable programming language and may be stored in memory such as the memory 160, and may be executed by a controller or a processor, such as the controller 180.

Figure 2A:
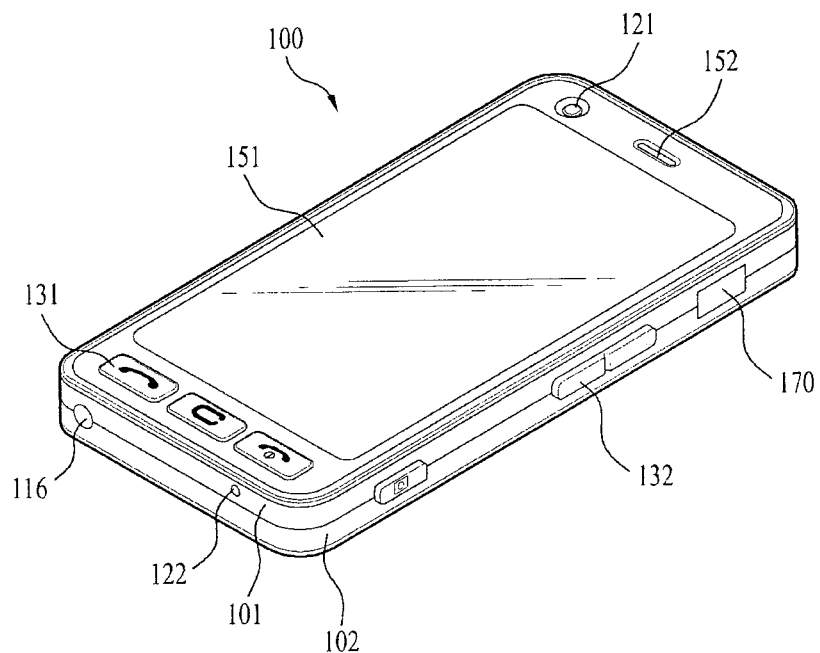
FIG. 2A is a front perspective diagram of a mobile terminal according to one example embodiment.

FIG. 2A is a front perspective diagram of a mobile terminal according to one example embodiment.

The mobile terminal 100 may have a bar type terminal body. The mobile terminal 100 may be implemented in a variety of different configurations. Examples of such configurations may include folder-type, slide-type, rotational-type, swing-type and/or combinations thereof. For ease of description, a further disclosure may primarily relate to a bar-type mobile terminal 100. However, such teachings may apply to other types of mobile terminals.

As shown in FIG. 2A, the mobile terminal 100 may include a case (e.g. casing, housing, cover, etc.) configuring an exterior thereof. The case may be divided into a front case 101 and a rear case 102. Various electric/electronic parts may be loaded in a space provided between the front case 101 and the rear case 102. At least one middle case (or intermediate case) may be provided between the front case 101 and the rear case and 102.

The first and rear cases 101 and 102 may be formed by injection molding of a synthetic resin or may be formed of a metal substance such as stainless steel (STS), titanium (Ti) or the like, for example.

The display 151, the audio output unit 152, the camera 121, the user input unit 130 (including first and second manipulation units 131 and 132), the microphone 122, the interface unit 170 and the like may be provided to the terminal body, and more particularly to the front case 101.

The display 151 may occupy most of a main face of the front case 101. The audio output unit 151 and the camera 121 may be provided at an area adjacent to one of both end portions of the display 151, while the first manipulation unit 131 and the microphone 122 may be provided at another area adjacent to the other end portion of the display 151. The second manipulation unit 132 and the interface unit 170 can be provided on lateral sides of the front and rear cases 101 and 102.

The input unit 130 may receive a command for controlling an operation of the mobile terminal 100. The input unit 130 may include first and second manipulating units 131 and 132. The first and second manipulating units 131 and 132 may be called a manipulating portion and may adopt any mechanism of a tactile manner that enables a user to perform a manipulation action by experiencing a tactile feeling.

Content inputted by the first or second manipulating unit 131 or 132 may be diversely set. For example, commands such as start, end, scroll and/or the like may be inputted to the first manipulating unit 131. A command for a volume adjustment of sound outputted from the audio output unit 152, a command for a switching to a touch recognizing mode of the display 151 and/or the like may be inputted to the second manipulating unit 132.

Figure 2B:
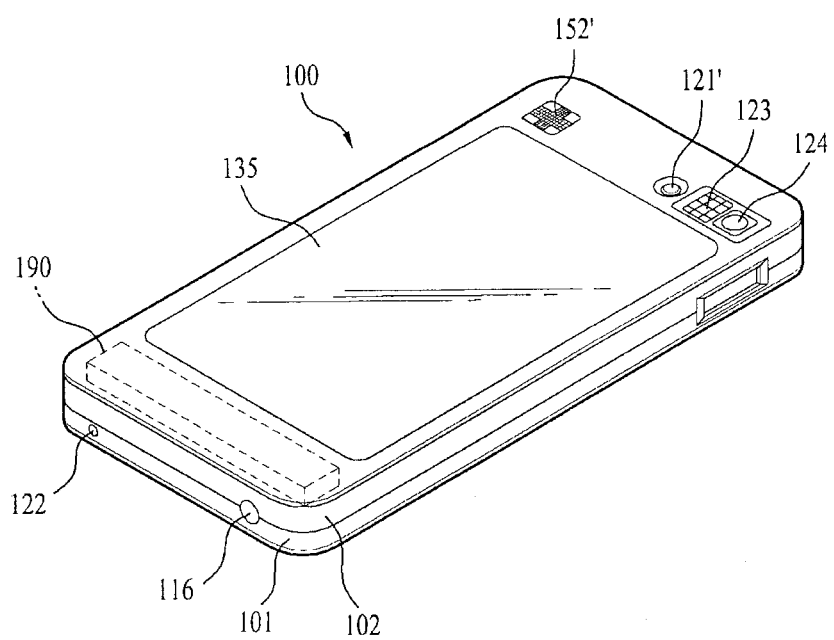
FIG. 2B is a rear perspective diagram of a mobile terminal according to one example embodiment.

FIG. 2B is a perspective diagram of a backside of the mobile terminal shown in FIG. 2A.

As shown in FIG. 2B, a camera 121' may be additionally provided on a backside of the terminal body, and more particularly on the rear case 102. The camera 121' may have a photographing direction that is substantially opposite to a photographing direction of the camera 121 and may have pixels differing from the camera 121.

The camera 121 may have lower resolution pixels enough to capture and transmit a picture of user's face for a video call, while the camera 121' may have higher resolution pixels for capturing a general subject for photography without transmitting the captured subject. Each of the cameras 121 and 121' may be installed on the terminal body to be rotated or popped up.

The camera 121' of the rear case 102 may be usable for a video call.

A flash 123 and a mirror 124 may be additionally provided adjacent to the camera 121'. The flash 123 may project light toward a subject in case of photographing the subject using the camera 121'. If a user attempts to take a picture of the user (i.e., self-photography) using the camera 121', the mirror 124 may enable the user to view the user's face reflected by the mirror 124.

An additional audio output unit 152' may be provided on the backside of the terminal body. The additional audio output unit 152' may implement a stereo function together with the audio output unit 152 shown in FIG. 2A and may be used for implementation of a speakerphone mode in talking over the mobile terminal 100.

A broadcast signal receiving antenna 124 may be additionally provided on the lateral side of the terminal body as well as an antenna for communication or the like. The antenna 124 may be considered as a portion of the broadcast receiving module 111 and may be retractably provided on the terminal body.

The power supply 190 for supplying a power to the terminal 100 may be provided on the terminal body. The power supply unit 190 may be built within the terminal body. Alternatively, the power supply 190 may be detachably connected to the terminal body.

A touchpad 135 for detecting a touch may be additionally provided on the rear case 102. The touchpad 135 may be configured in a light transmittive type in a similar manner as the display 151. If the display 151 is to output visual information from its both faces, it may also recognize the visual information via the touchpad 135. The information outputted from both of the faces may be entirely controlled by the touchpad 135. A display may be further provided to the touchpad 135 so that a touchscreen can be provided to the rear case 102.

The touchpad 135 may be activated by interconnecting with the display 151 of the front case 101. The touchpad 135 may be provided in rear of the display 151 and in parallel. The touchpad 135 may have a size equal to or smaller than the display 151.

In the following description, the display 151 includes a touchscreen. A display screen of the touchscreen 151 may be indicated by a reference number 400.

Another mobile terminal 500 (hereafter called another terminal, a called terminal and/or a correspondent party terminal) may perform a video call (or video conference) with the mobile terminal 100. A display screen of a touch screen of the another terminal 500 may be labeled with a reference number 600.

A method of controlling a mobile terminal according to an example embodiment of the present invention may now be explained with reference to FIGS. 3 to 12.

Figure 3:
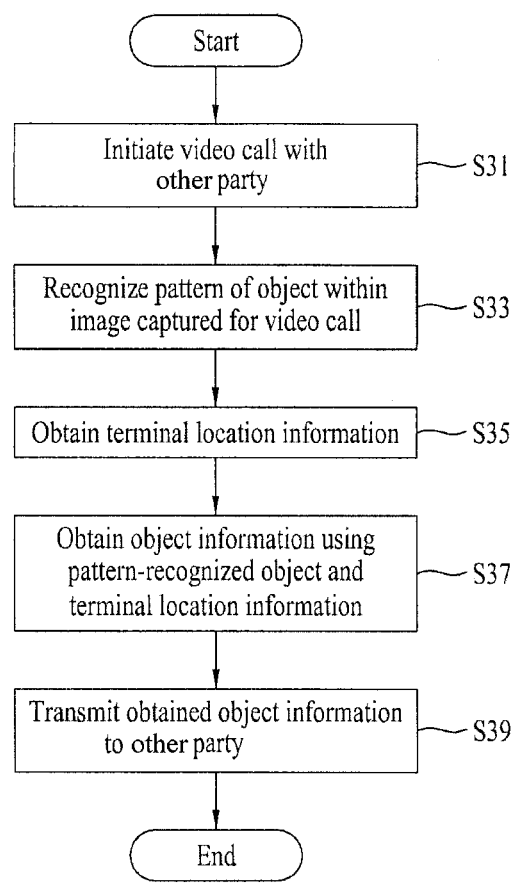
FIG. 3 is a flowchart of a method of controlling a mobile terminal according to an example embodiment.
Figure 4:
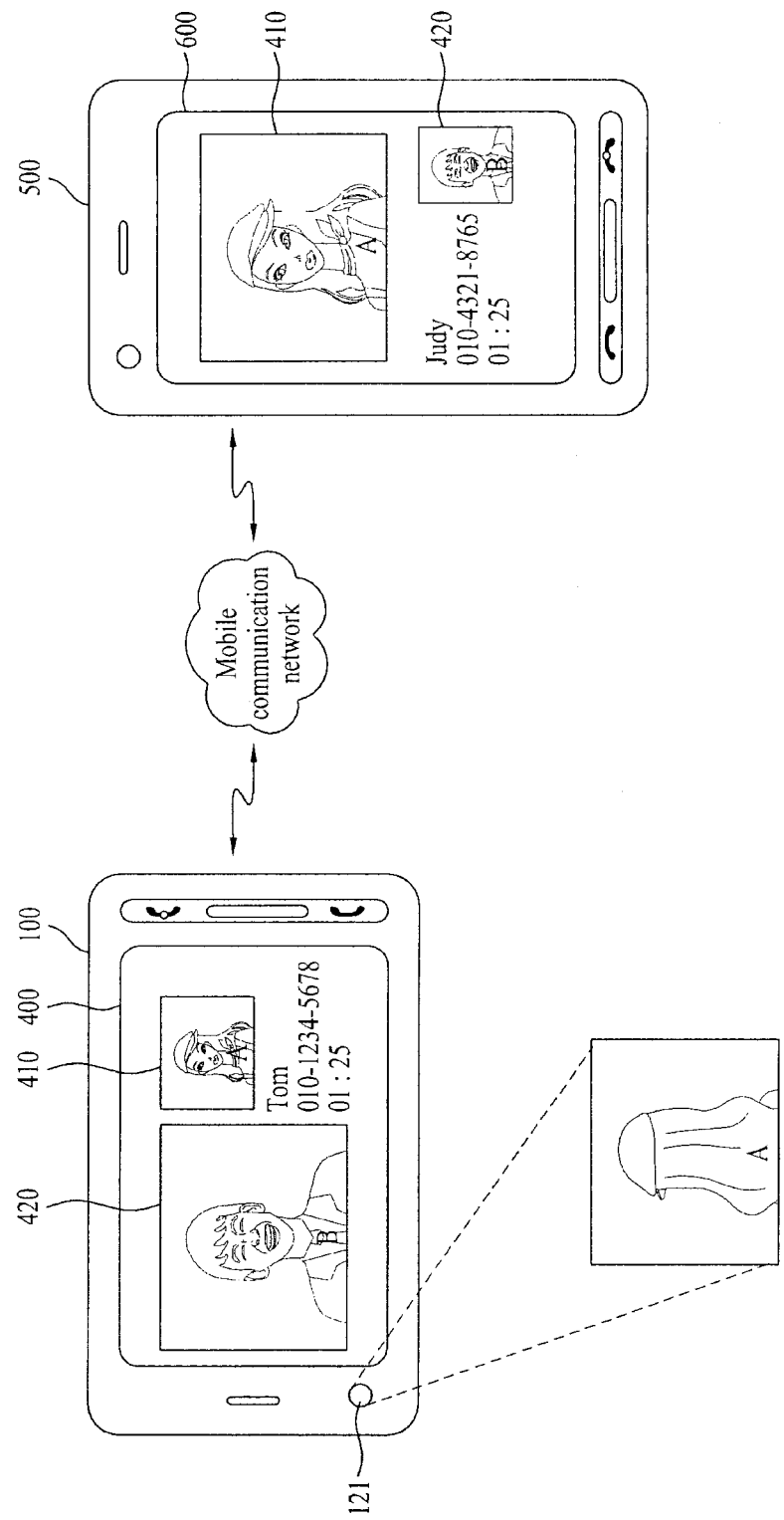
FIG. 4 and FIG. 5 are diagrams showing a mobile terminal that performs a video call with another terminal.
Figure 5:
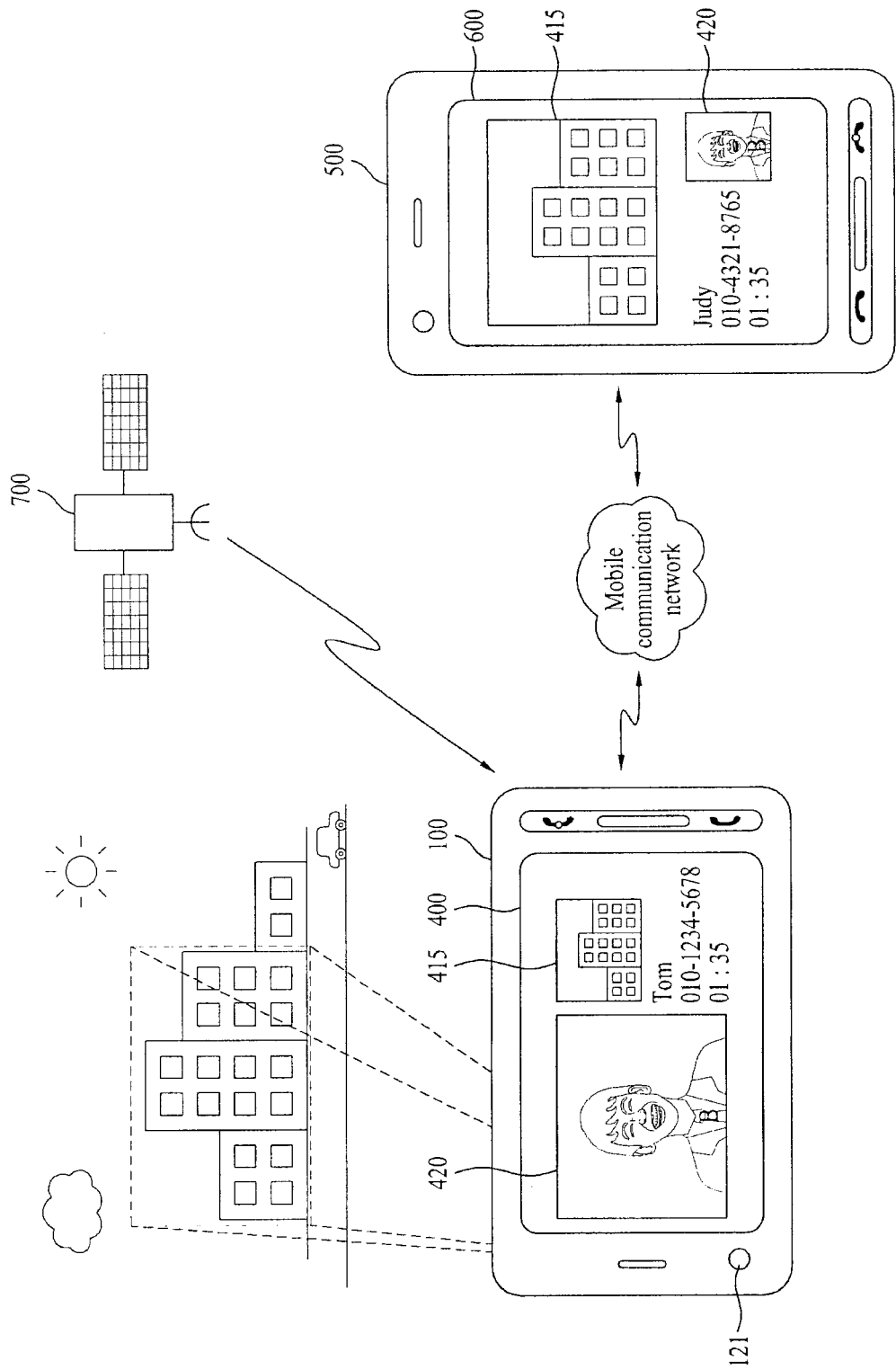

FIG. 3 is a flowchart for a method of controlling a mobile terminal according to an example embodiment of the present invention. Other embodiments, operations and orders of operation are also within the scope of the present invention. FIG. 4 and FIG. 5 are diagrams showing a mobile terminal that performs a video call with another terminal. FIGS. 6 to 12 are diagrams for screen configurations of a display in which a method of controlling a mobile terminal is implemented.

As shown in FIG. 4, the mobile terminal 100 is in a course of performing a video call (or a video conference) with the another terminal 500 in operation S31.

An image (hereafter called a user image) of a user face captured by the camera 121 (hereafter called a first camera) provided on the front case of the mobile terminal 100 may be displayed on the touchscreen 400 of the mobile terminal 100. The user image 410 may be transmittable to the another terminal 500 via a mobile communication network in a course of the video call (or video conference).

Another party image 420 (or other party image) received from the mobile terminal 100 in the course of the video call may be displayed on the touchscreen 400 of the mobile terminal 100. The another party image 420 may correspond to a user of the other terminal 500.

The touchscreen 600 of the other terminal 500 may display both the user image 410 received from the mobile terminal 100 and the other party image 420 to be transmitted to the mobile terminal 100.

The mobile terminal 100 may provide the other terminal 500 with other information and the user image 410 in the course of the video call. For example, the mobile terminal 100 may provide a surrounding image of the mobile terminal 100 captured by the camera 121' (hereafter called a second camera) provided on the rear case of the mobile terminal 100 to the other terminal 500 together with or rather than of the user image 410.

The mobile terminal 100 may display the surrounding image 415 captured by the second camera 121' on the touchscreen 400, as shown in FIG. 5.

The mobile terminal 100 may transmit the surrounding image 415 to the other terminal 500 in the course of the video call (or video conference). The other terminal 500 may display the surrounding image 415 on its touchscreen 600.

An appropriate manipulation of the user input unit 130 may be used to select whether the mobile terminal 100 is to transmit either the user image 410 or the surrounding image 415 to the other terminal 500 or whether the mobile terminal 100 is to transmit both the user image 410 and the surrounding image 415.

The controller 180 may recognize a pattern, a shape or a characteristic of at least one object (e.g., a building, a shop, a milepost, etc.) within the captured surrounding image 415 in operation S33.

The controller 180 may obtain at least one (hereafter called location information) of a longitude, a latitude, an altitude or a direction of the mobile terminal 100 that are received from a satellite 700 via the position-location module 115 in operation S35.

The operations S33 and S35 may also be executable in reverse order or may be simultaneously executable.

The controller 180 may identify an object of the surrounding image 415 using the obtained location information and the recognized information (e.g., information of the object) (hereafter called recognition information or pattern recognition information) of the object and may generate information (hereafter called object information) of the identified object in operation S37.

In identifying or determining the object, either the location information or the (pattern) recognition information may be used. If both the location information and the (pattern) recognition information are used, then the identification of the object may be more reliable.

As discussed above, the object information may include at least one of relevant text information of the recognized object (e.g., a name of the building, a name of the shop, etc.), relevant link information (e.g., link information of the building or the shop), relevant image information (e.g., an image logo of the building or the shop, etc.) and/or relevant audio information (e.g., a logo song of the building or the shop).

The controller 180 may generate the object information by referring to a database for the object information stored in the memory 160. The controller 180 may also generate the object information by accessing an external server providing the database for the object information via the wireless communication unit 110.

If the controller 180 refers to a database of the external server, the database may not have been previously stored in the memory 160.

The display 151 (such as the touchscreen 400) may display the captured image, the obtained information and information regarding a user of the another terminal 500.

The controller 180 may transmit the object information together with the captured surrounding image 410 to the other terminal 500 in the course of the video call in operation S39. The controller 180 may transmit the object information such that the object information can be displayed as an augmented reality image on the other terminal 500. The controller 180 and/or the wireless communication unit 110 may transmit at least one of the obtained information regarding the object or the captured image to the other terminal 500 during the video call.

Generating and providing the object information to the other terminal 500 may be further explained with reference to FIGS. 6 to 12.

As shown in (6-1) of FIG. 6, both the surrounding image 415 and the other party image 420 may be displayed on the touchscreen 400 of the mobile terminal 100. In (6-1) of FIG. 6 the surrounding image 415 may be displayed smaller than the other party image 420. The surrounding image 415 may also be displayed larger than the other party image 420.

The controller 180 may display the generated object informations 431 and 433 on the corresponding object of the surrounding image 415. The object information may be displayed as an augmented reality image on the corresponding object.

The user input unit 130 may be used to select whether the object informations 431 and 433 are displayed on (or with respect to) the surrounding image 415.

The controller 180 may transmit the surrounding image 415 and the object informations 431 and 433 to the other terminal 500.

The transmitted surrounding image 415 and the object informations 431 and 433 may be displayed on the touchscreen 600 of the other party terminal 500, as shown in (6-2) or FIG. 6.

If the controller 180 combines (or synthesizes) the surrounding image 415 and the object informations 431 and 433 into one image and then transmits the combined image to the other party terminal 500, the object informations 431 and 433 may keep being displayed on the other terminal 500 together with the surrounding image 415.

If the controller 180 transmits the surrounding image 415 and the object informations 431 and 433 to the other terminal 500 by separating the surrounding image 415 from the object informations 431 and 433 or enables the surrounding image 415 and the object informations 431 and 433 to be separated from each other, then a determination of whether the object informations 431 and 433 will be displayed on the surrounding image 415 may be determined according to a selection made by the other party.

When the mobile terminal 100 and the other terminal 500 are interconnected to each other, if the object informations 431 and 433 are displayed on the surrounding image 415 in the mobile terminal 100, the object informations 431 and 433 may be displayed on the surrounding image 415 on the other terminal 500. If the object informations 431 and 433 are not displayed on the surrounding image 415 on the mobile terminal 100, then the object informations 431 and 433 may not be displayed on the surrounding image 415 on the other terminal 500.

If the object informations 431 and 433 are displayed on the surrounding image 415 on the other terminal 500, then the object informations 431 and 433 may be displayed on the surrounding image 415 on the mobile terminal 100. If the object informations 431 and 433 are not displayed on the surrounding image 415 on the other terminal 500, then the object informations 431 and 433 may not be displayed on the surrounding image 415 on the mobile terminal 100.

FIG. 6 shows that all object informations 431, 433 within the surrounding image 415 are displayed. The object informations of the surrounding image 415 may also be displayed in part. This may be explained in detail with reference to FIG. 7.

The surrounding image 415 having no object information may be displayed on the touchscreen 400 of the mobile terminal 100 and the touchscreen 600 of the other terminal 500.

One point on the surrounding image 415 displayed on the touchscreen 600 of the other terminal 500 may be touched. The other terminal 500 may transmit a location of one point of the surrounding image 415 to the mobile terminal 100.

The mobile terminal 100 may receive the location and then transmit object information of an object corresponding to the received location to the other terminal 500. The mobile terminal 100 may display the object information 433 on the surrounding image 415, as shown in (7-1) of FIG. 7.

As shown in (7-2) of FIG. 7, the transmitted object information 433 may be displayed on the surrounding image 415 displayed on the other terminal 500.

The surrounding image and the user image displayed on the mobile terminal 100 may be explained with reference to FIG. 8.

As shown in (8-1) of FIG. 8, the surrounding image and the user may be displayed as one image 417 on the touchscreen 400 of the mobile terminal 100 by overlapping with each other. In this case, the object information may be displayed on the overlapped image 417. Even if the one overlapped image 417 is transmitted to the other terminal 500 or the overlapped image 417 is displayed on the touchscreen 400, the mobile terminal 100 may selectively transmit at least one of the surrounding image and the user image to the other terminal 500 individually.

Alternatively, as shown in (8-2) of FIG. 8, the surrounding image 415 and the user image 410 may be separately displayed on the touchscreen 400 of the mobile terminal 100 by being discriminated from each other.

The surrounding image and the user image displayed on the mobile terminal 100 may be further explained with reference to FIG. 9.

As shown in (9-1) of FIG. 9, when the mobile terminal 100 individually transmits the surrounding image and the user image to the other terminal 500, both the surrounding image 415 (including the object information) and the user image 410 may be simultaneously displayed on the touchscreen 600 of the other terminal 500.

Even if the mobile terminal 100 individually sends the surrounding image 415 and the object informations 431 and 433 to the other terminal 500, the other party terminal 500 may not be able to combine (or synthesize) the surrounding image 415 and the object informations 431 and 433 together due to limited performance.

In this case, the mobile terminal 100 may convert the object informations 431 and 433 into texts and then transmit the texts to the other terminal 500. Upon receiving the texts, the other terminal 500 may display the object information 610 transmitted as the texts, as shown in (9-2) of FIG. 9. The mobile terminal 100 may also transmit only link information of the object information to the other terminal 500 (not shown).

As described above, in transmitting the surrounding image to the other terminal 500, the mobile terminal 100 may or may not transmit the corresponding object information together with the surrounding image 415. The mobile terminal 100 may transmit the corresponding object information to the other terminal 500 rather than transmitting the surrounding image to the other terminal 500. This may be further explained with reference to FIG. 10.

Referring to (10-1) of FIG. 10, the surrounding image including the object informations 431 and 433 and the other party image 420 may be displayed on the touchscreen 400 of the mobile terminal 100.

In this case, after an edge part of the surrounding image 415 has been touched with a pointer (e.g., a finger, a stylus pen, etc.), the pointer may be dragged, moved or copied to the other party image 420. The mobile terminal 100 may then transmit the object informations 431 and 433 and the surrounding image 415 to the other terminal 500.

Alternatively, as shown in (10-2) of FIG. 10, at least one object information 431 of the object informations 431 and 433 may be touched and dragged (or moved or copied) to the other party image 420.

The mobile terminal 100 may transmit the touched object information 431 to the other terminal 500 or may transmit both the object informations 431 and 433 to the other terminal 500.

Alternatively, as shown in (10-3) of FIG. 10, a background part of the surrounding image 415 on which the object informations 431 and 433 are not displayed may be touched and dragged (or moved or copied) to the other party image 420.

The mobile terminal 100 may transmit the background part (i.e., the surrounding image 415 not including the object information) to the other terminal 500.

The controller 180 may transmit the captured image and the obtained object information to the other terminal 500 when the captured image is moved to the user image (i.e., the other party image 420). The controller 180 may also transmit the obtained object information to the other terminal 500 only when the displayed object information is moved to the user image (i.e., the other party image 420). Still further, the controller 180 may transmit the captured image to the other terminal 500 only when the captured image is moved to the user image (i.e., the other party image 420).

A portion of the touchscreen 400 on which the above described touch & drag is performed to determine whether to transmit the surrounding image and/or the object information may have various modifications. This may be apparent to those skilled in the art. Rather than using a touch and drag operation, objects and images may also be copied or moved.

Figure 11:
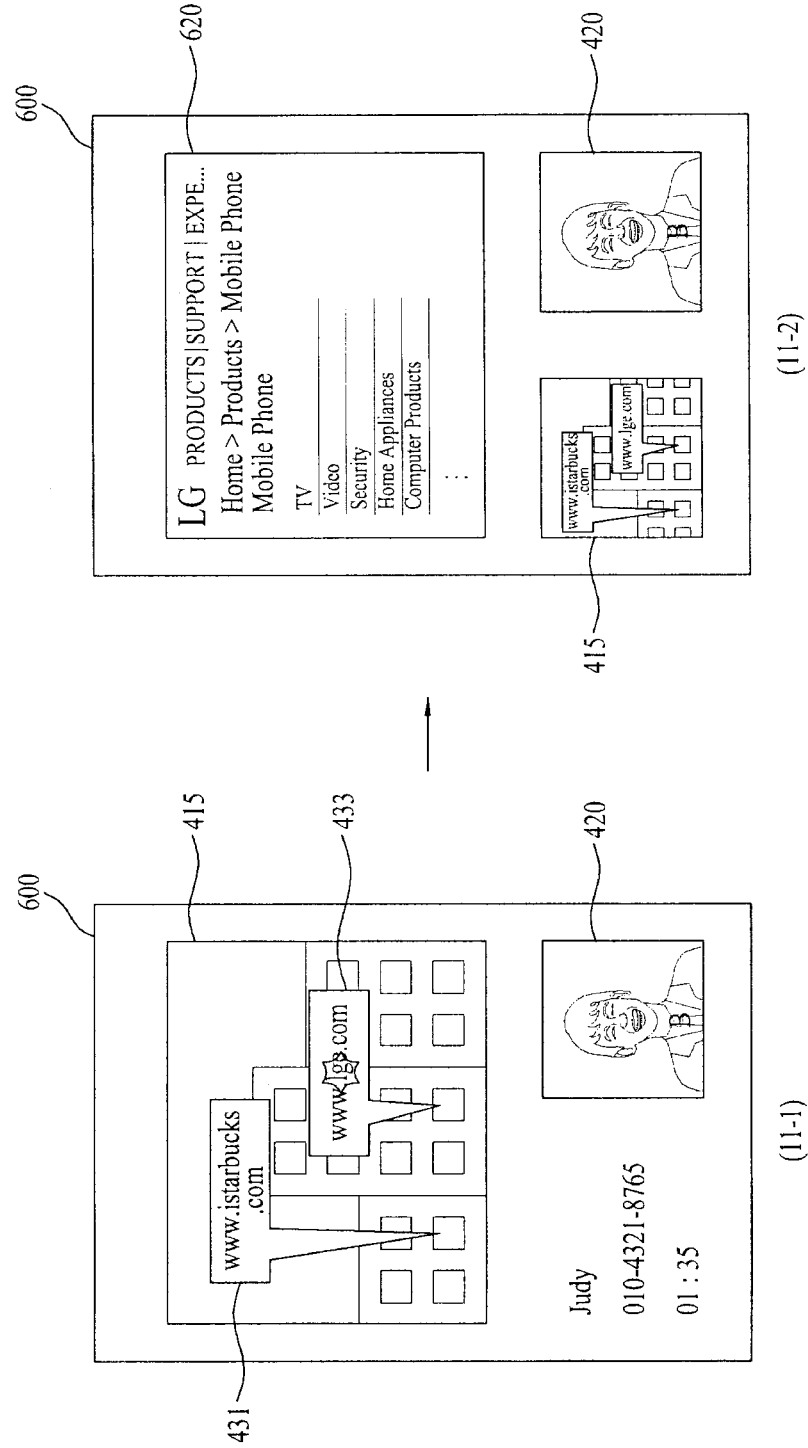

FIG. 11 may now be explained. As shown in (11-1) of FIG. 11, the surrounding image 415 and the corresponding object informations 431 and 433 may be displayed on the touchscreen 600 of the other terminal 500. In order to emphasize that the object information has relevant link information, corresponding link information may be displayed as the object information on the surrounding image 415.

Subsequently, one object information 433 of the object informations 415 and 433 may be touched by a user of the other terminal 500.

As shown in (11-2) of FIG. 11, a webpage image 620 that is Internet-accessed according to the corresponding link information of the touched object information 433 may be displayed on the touchscreen 600 of the other terminal 500.

If the other terminal 500 is provided with a wireless Internet module, the other terminal 500 may perform an Internet access according to the link information via the provided wireless Internet module, download the webpage image 620 via the accessed Internet and then display the webpage image 620.

If the other terminal 500 is not provided with a wireless Internet module, the other terminal 500 may transmit the corresponding link information of the touched object information 433 to the mobile terminal 100. The mobile terminal 100 may access the Internet according to the corresponding link information, download the webpage image via the accessed Internet, and then transmit the downloaded webpage image to the other terminal 500. The other terminal 500 may receive the transmitted webpage image 620 and then display the received webpage image 620.

FIG. 12 may now be explained. As shown in (12-1) and (12-2) of FIG. 12, the surrounding image and the corresponding object information of the mobile terminal 100 may be displayed on the other terminal 500.

As shown in (12-2) of FIG. 12, the other party may shift and/or incline the other terminal 500 in a prescribed shift direction (e.g., a right direction). A sensing unit of the other terminal 500 may detect at least one of a shift or an inclination in the prescribed direction and then transmit the detected shift or inclination to the mobile terminal 100.

As shown in (12-1) of FIG. 12, the mobile terminal 100 may display the prescribed shift direction of the other party on the touchscreen 400 according to at least one of the shift and the inclination using an indicator 441. That is, the controller 180 may receive a shift direction of the other terminal 500 and display the received shift direction on the touchscreen 400 (i.e., display the indicator 441).

The terminal user may shift and/or incline the mobile terminal 100 according to the prescribed shift direction of the other party by referring to the displayed indicator 441.

The surrounding image 415 captured according to the prescribed shift direction by the mobile terminal 100 may be transmitted to the other terminal 500.

The prescribed shift direction may be transmittable to the mobile terminal 100 by other means in addition to the shift of the other terminal 500.

For example, it may deliver the prescribed shift direction to the mobile terminal 100 by an appropriate user input unit manipulation (e.g., a navigation key manipulation) of the other terminal 500.

Alternatively, a prescribed shift location may be inputted via the user input unit manipulation in the other terminal 500, and the prescribed shift location may be delivered to the mobile terminal 100. The mobile terminal 100 may compare the prescribed shift location with current location information of the position-location module 115 and then display a direction to move to the prescribed shift location using the indicator 441 or display the prescribed shift location on a prescribed map (not shown).

When receiving prescribed object information from the other terminal 500, the controller 180 may display shift information for the mobile terminal 100 in order to display the prescribed object information on the touchscreen 400.

An icon may be used to be selected by a touch on a touchscreen. This mechanism may be performed through an appropriate key manipulation of a keypad of the user input unit.

The mobile terminal may include at least two cameras, and the controller may control a first camera of the at least two cameras to be activated when a menu for obtaining the object information is not entered, and the controller may control a second camera of the at least two cameras or both the first camera and the second camera to be activated when the menu for obtaining the objection information is entered.

The controller may obtain the object information within the image captured by the second camera. The controller may control the images captured by the first camera and the second camera to be displayed by being separated from each other or by being overlapped with each other when both the first camera and the second camera are activated.

Embodiments may provide effects and/or advantages.

A user may be further induced to use a user video call when a video call is performed between at least two terminal users in a manner of increasing efficiency of utility by transceiving more information together with speech and video of the users.

The above-described methods may be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). The computer may include the controller 180 of the terminal.

Embodiments of the present invention may provide a mobile terminal and controlling method thereof by which a user may be induced to use a user video call when a video call is performed between at least two terminal users in a manner of increasing efficiency of utility by transceiving more information together with speech and video of the users.

A mobile terminal may include a camera module, a wireless communication unit configured to perform a video call with another party (or a correspondent party), a display unit (or display) configured to display a video call relevant image, a location information module configured to obtain location information of the mobile terminal, and a control unit (or controller) configured to obtain object information of an object within an image captured by the camera module based on the obtained location information of the mobile terminal, and to transmit the obtained object information to a terminal of the other party.

A method may be provided of controlling a mobile terminal. The method may include performing a video call with another party (or a correspondent party), displaying a video call relevant image, obtaining location information of the mobile terminal, obtaining object information of an object within an image captured by a camera module based on the obtained location information of the mobile terminal, and transmitting the obtained object information to a terminal of the other party.

A mobile terminal may also include a camera module, a wireless communication unit configured to perform a video call with another party (i.e., a correspondent party), a display unit (or display) configured to display a video call relevant image, and a control unit (or controller) configured to recognize a pattern of an object within an image captured by the at least one camera module, to obtain object information of the object based on a pattern recognition result, and to transmit the obtained object information to a terminal of the another party.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification ate not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a display;
a first camera configured to capture a first user image of the mobile terminal;
a second camera configured to capture a surrounding image, wherein the surrounding image comprises image data depicting an area surrounding a user that captures the surrounding image;
a wireless communication unit configured to perform a video call with another terminal;
a controller configured to:

obtain object information regarding an object in the captured surrounding image; and display, on the display, the captured surrounding image, the obtained object information and information regarding a user of the another terminal; and transmit, via the wireless communication unit, both the obtained object information regarding the object and the captured surrounding image to the another terminal during the video call such that the obtained object information is displayed, in the another terminal, to correspond to a location of the object in the captured surrounding image.

2. The mobile terminal of claim 1, wherein the controller obtains the information regarding the object from a memory of the mobile terminal.

3. The mobile terminal of claim 1, wherein the controller obtains the information regarding the object from a server located external to the mobile terminal.

4. The mobile terminal of claim 1, further comprising a location module to obtain location information of the mobile terminal, wherein the controller obtains the object information regarding the object in the captured surrounding image based on the obtained location information of the mobile terminal.

5. The mobile terminal of claim 1, wherein the controller transmits the object information regarding the object to the another terminal, wherein the transmitted information is text or link information regarding the object.

6. The mobile terminal of claim 1, wherein the display includes a touchscreen, wherein the controller displays a second user image of the another terminal on the touchscreen, and wherein the controller combines the captured surrounding image with the obtained object information and displays a combined image on the touchscreen.

7. The mobile terminal of claim 6, wherein the controller transmits the captured surrounding image and the obtained object information to the another terminal when the captured surrounding image is moved to the second user image.

8. The mobile terminal of claim 6, wherein the controller transmits the obtained object information to the another terminal only when the displayed object information is moved to the second user image.

9. The mobile terminal of claim 6, wherein the controller transmits the captured surrounding image to the another terminal only when the captured surrounding image is moved to the second user image.

10. The mobile terminal of claim 6, wherein the controller to determine whether the captured surrounding image is displayed on the touchscreen by being combined with the obtained object information, and wherein based on the selection, the controller selectively transmits the captured surrounding image combined with the obtained object information to the another terminal or transmits the captured surrounding image not combined with the obtained object information to the another terminal.

11. The mobile terminal of claim 6, wherein the controller receives a shift direction of the another terminal and displays the received shift direction on the touchscreen.

12. The mobile terminal of claim 6, wherein when receiving prescribed object information from the another terminal, the controller displays shift information for the mobile terminal to move in order to display the prescribed object information on the touchscreen.

13. The mobile terminal of claim 6, wherein the controller displays a webpage corresponding to link information on the display when the link information in the object information displayed on the another terminal is selected by the user of the another terminal.

14. The mobile terminal of claim 1, wherein the controller stores the obtained object information in a memory such that the obtained object information is combined with the captured surrounding image or the obtained object information is separated from the captured surrounding image.

15. The mobile terminal of claim 1, wherein the controller controls the first camera to be activated when a menu for obtaining the object information is not entered, and the controller controls the second camera or both the first camera and the second camera to be activated when the menu for obtaining the objection information is entered.

16. The mobile terminal of claim 15, wherein the controller controls the first user image and the surrounding image to be displayed by being separated from each other or by being overlapped with each other when both the first camera and the second camera are activated.

17. The mobile terminal of claim 1, wherein the controller controls the object information selected by the another party to be transmitted only.

18. The mobile terminal of claim 1, further comprising a memory to store at least one of the captured first user image and the captured surrounding image.

19. The mobile terminal of claim 1, wherein the controller is further configured to superimpose the obtained object information on the captured surrounding image, and to control the wireless communication unit to transmit the captured surrounding image with the obtained object information superimposed thereon to the another terminal during the video call.

20. A method of controlling a mobile terminal, the method comprising:

capturing a first user image using a first camera of the mobile terminal;

capturing a surrounding image using a second camera of the mobile terminal, wherein the surrounding image comprises image data depicting an area surrounding a user that captures the surrounding image;

performing a video call with another terminal;

obtaining information of an object in the captured surrounding image;

displaying, on the mobile terminal, the captured surrounding image, the obtained information and information regarding a user of the another terminal; and transmitting both the obtained information regarding the object and the captured surrounding image to the another terminal during the video call such that the obtained object information is displayed, in the another terminal, to correspond to a location of the object in the captured surrounding image.

21. The method of claim 20, wherein obtaining the information of the object includes obtaining the information of the object from a memory of the mobile terminal.

22. The method of claim 20, wherein obtaining the information of the object includes obtaining the information of the object from a server located external to the mobile terminal.

23. The method of claim 20, wherein obtaining the information includes obtaining the information of the object in the captured surrounding image based on location information of the mobile terminal.

24. The method of claim 20, further comprising:
superimposing the obtained object information on the captured surrounding image; and transmitting the captured surrounding image with the obtained object information superimposed thereon to the another terminal during the video call.

25. A mobile terminal comprising:
a display;
a first camera configured to capture a first user image of the mobile terminal;
a second camera configured to capture a surrounding image, wherein the surrounding image comprises image data depicting an area surrounding a user that captures the surrounding image;
a memory configured to store at least one of the captured first user image and the captured surrounding image;
a wireless communication unit configured to perform a wireless communication;
a location module configured to obtain location information of the mobile terminal; and
a controller configured to:
  obtain information regarding an object in the captured surrounding image based on the obtained location information of the mobile terminal;
  display, on the display, the captured surrounding image, the obtained information and information regarding another person; and
  transmit, via the wireless communication unit, both the obtained information regarding the object and the captured surrounding image during the wireless communication such that the obtained object information is displayed at the another terminal to correspond to a location of the object in the captured surrounding image.

26. The mobile terminal of claim 25, wherein the controller obtains the information regarding the object from a memory of the mobile terminal.

27. The mobile terminal of claim 25, wherein the controller obtains the information regarding the object from a server located external to the mobile terminal.

28. The mobile terminal of claim 25, wherein the controller is further configured to superimpose the obtained object information on the captured surrounding image, and to control the wireless communication unit to transmit the captured surrounding image with the obtained object information superimposed thereon to the another terminal during the video call.

* * * * *